(No Model.)
F. STEMMERICH.
KEY SEAT RULE.
No. 548,329. Patented Oct. 22, 1895.
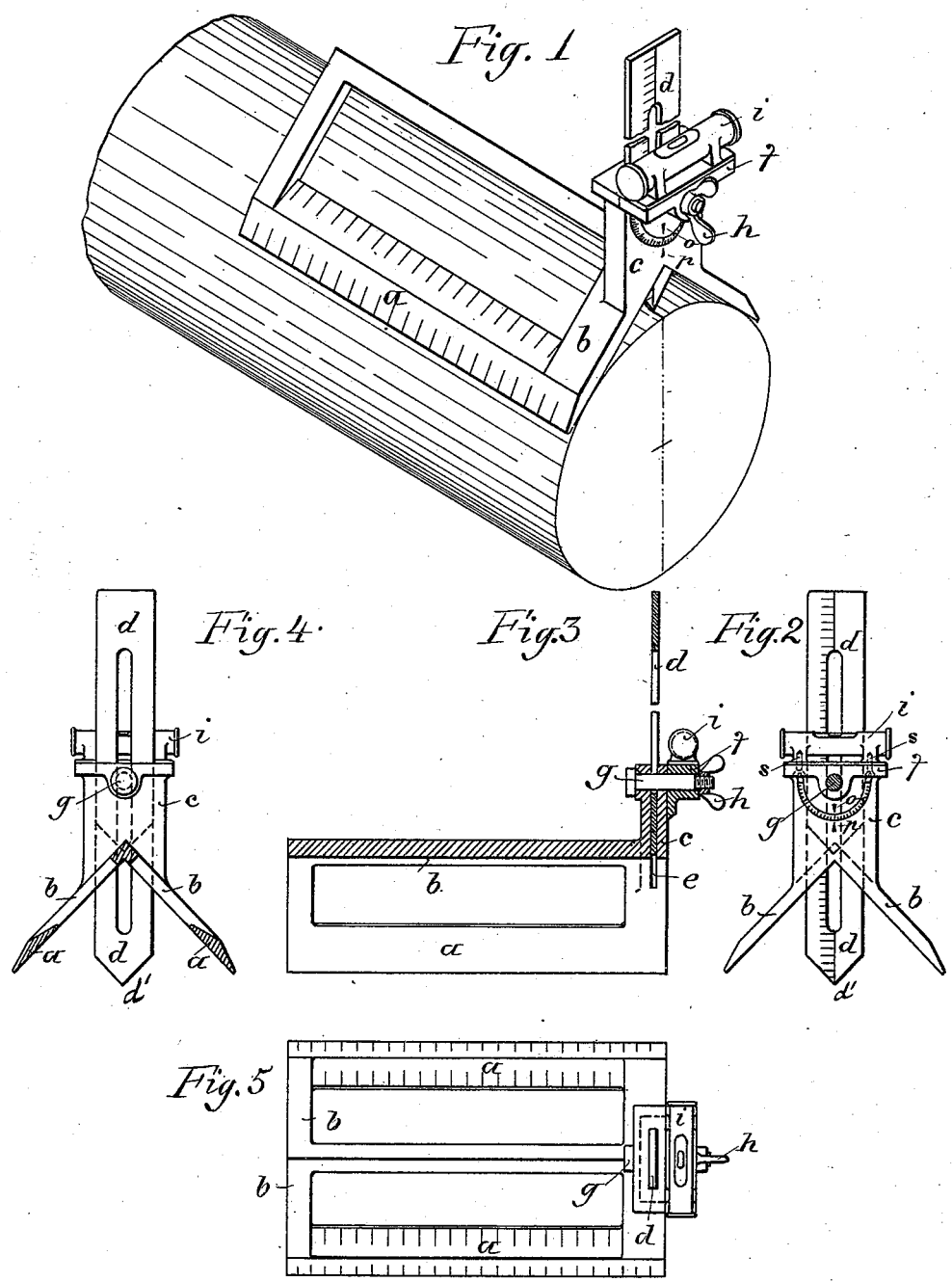
Witnesses
William Mueser
N. Tamser
Fred'k Stemmerich Inventor
By his Attorney Henry Schreiter

UNITED STATES PATENT OFFICE.

FREDERICK STEMMERICH, OF PITTSBURG, PENNSYLVANIA.

KEY-SEAT RULE.

SPECIFICATION forming part of Letters Patent No. 548,329, dated October 22, 1895.

Application filed March 7, 1895. Serial No. 540,873. (No model.)

*To all whom it may concern:*

Be it known that I, FREDERICK STEMMERICH, a citizen of the United States, and a resident of Pittsburg, county of Allegheny, and State of Pennsylvania, have invented certain new and useful Improvements in Key-Seat Rules, of which the following is a clear, full, and exact specification, reference being had to the accompanying drawings, wherein—

Figure 1 is a perspective view, Fig. 2 a front view, Fig. 3 a horizontal view, Fig. 4 a cross-section, and Fig. 5 a top view, of my improved key-seat rule.

Similar letters of reference indicate corresponding parts.

My invention relates to gages and rules as are used in building and setting up of machinery; and it consists of a combined key-seating rule and splining-gage for laying out of key-seats, slotways or rabbets, grooves for measuring of diameters of bores of pulleys, cylinders, &c., for setting shafts for drilling or milling, and for other similar purposes.

Correct seating of a key upon the shaft and in the boss of a pulley is an essential requirement in setting up of machinery. The key in order to withstand the torsive strain exerted upon it by the opposing forces—the power driving the shaft and the load on the pulley—must be seated exactly parallel with the axis and its base must be at right angles with the diameter of the shaft. A faultily-set key will not have a solid bearing and the pulley will soon be worked loose upon the shaft. Often it is also required that two or more key-seats on a shaft be laid out exactly in one line. This cannot be well accomplished with the rules and gages heretofore known or used for the purpose, nor can these instruments be depended upon in setting of a shaft or wheel upon the table of a milling-machine.

Having during many years of practical experience in this line of work acquainted myself intimately with the requirements and uses of such an instrument, I construct my improved key-seat rule and splining-gage as illustrated in the accompanying drawings. This gage comprises two rules $a$ and $a$, set in an angular frame $b$. Upon this frame the socket $c$ is set, rising vertically over its ridge. Sliding rule $d$ moves in slot $e$, provided in the socket $c$, exactly in the line bisecting the right angle of the frame. Swivel-table $f$ is attached by the stud $g$ to this socket $c$ and fastened by the thumb-screw $h$. Level $i$ is secured to the swivel-table $f$ and turns with it on the stud $g$. Thumb-screw $h$ serves the purpose of fixing the swivel-table $f$ with the level $i$ in such position as the operation may require.

The support $f'$ of the swivel-table, closely fitted upon the socket $c$, is semicircular in shape, beveled to a sharp edge on its circumference, and divided into grades, numbered from zero in the center line upward on both sides. A pointer $p$ is set upon the socket $c$ opposite the zero-mark "0" on the graduated edge of the support $f'$ to mark the position or deviation of the level from the line bisecting the angle of the frame. Stud $g$, zero-mark "0" on the graduated edge of the support $f$, and the pointer $p$ on the socket $c$ are set exactly in this line, bisecting the angle of the frame, and marked also upon the sliding rule $d$. This sliding rule $d$ is pointed on its lower edge, the point $d'$ culminating exactly in the center line. Thus in normal position when the gage is set upon a shaft, as shown in Fig. 1, so that the level $i$ will indicate a horizontal position, the center line, marked upon the sliding rule $d$, will indicate an exactly vertical line, which if prolonged would pass through the center of the shaft. This line will be indicated visibly upon the surface of the shaft by the point $d'$. In order to obtain an axis for a key-seat, this simple operation needs only to be repeated on two points sufficiently distant and to connect them. This would be the ordinary operation for laying out a key-seat. With my improved key-rule this is, however, not necessary. Being given the width of the key-seat and the length, I mark one point upon the shaft and set the point $d'$ of the sliding rule upon it and turn the swivel-table $f$ until level $i$ indicates a horizontal position, whereupon the swivel-table is fixed by tightening the screw $h$. Then the length of the key-seat is marked by means of the rule $a$ upon the shaft, the gage is moved the length of the seat, righted so that the level again indicates horizontal position of the swivel-table, and the point indicated by the point $d'$ of the sliding rule marked upon the shaft. Then the gage is moved across the shaft according to the width of the key-seat, (or the width of the key-seat may be measured and the gage set with the point $d'$ of the sliding rule upon the mark,) the swivel-table turned back or forward, as the case may be, until the level again indicates a horizontal position, then fastened by thumb-screws $h$, whereupon the gage is moved back on the shaft toward the starting-point set in accordance with the level, and the point indicated by the sliding rule $d$ is marked. The key-seat thus laid out will be exactly parallel with the axis of the shaft.

To set the shaft correctly upon the table of a milling-machine, the axis of the key-seat is ascertained by dividing its width, and the shaft is turned till the level of the gage, set with the point of the sliding rule upon this point of division, indicates its horizontal position.

To lay out the groove in the boss of pulley correspondingly with the key-seat upon the shaft, it is only necessary to note the number of degrees of deviation observed in laying out the key-seat upon the shaft and set the gage with the swivel-table turned correspondingly. The edges of the grooves may then be marked by rifts drawn along the edges of the rules $a$.

The operation of laying out two or more key-seats upon a shaft exactly in one line appears sufficiently clear from the explanation of laying out a single key-seat. If all of these key-seats are equally wide, then the marking proceeds from edge to edge, and for all key-seats alike; otherwise their common axis is marked first and then each key-seat laid out from the axis separately.

To ascertain the center of shaft, which often needs to be done when shafts are cut in pieces, my improved gage is set upon shaft on its end and the line indicated by the sliding rule marked on the cross-area of the shaft. Then the swivel-table $f$ is turned ninety degrees and the gage moved on the shaft until level $i$ indicates horizontal position. Then the sliding rule $d$ is pushed toward the line marked on the cross-area of the shaft. The point indicated by the sliding rule is the correct center of the shaft, and at the same time the numeral on the scale of the sliding rule falling in line with the circumference of the shaft, gives its radius.

For measuring the diameter of the bore of a pulley or of a cylinder my improved gage is set horizontally in the bore so that point $d'$ of the sliding rule will touch the face of the boss (or the flange of a cylinder) and the dimension is indicated upon the sliding rule, or if the length of sliding rule should not be sufficient for the purpose another rule may be laid upon the sliding rule indicating the center line and the diameter ascertained.

There are many other various uses for my improved key-seat rule which any one familiar with the work will readily understand and know from the explanations given above how to use this rule for such purposes and how to avail himself of the special advantages it offers.

My improved key-seat rule may preferably be made of cast-steel, the frame $b$ and socket $c$ being cast in one piece and the swivel-table $f$ and sliding rule $d$ each separately. The milling of the slot $e$, fitting and graduating of the sliding rule $d$ and of the rules $a$, and setting of the swivel-table $f$ upon the socket $c$ are done in the usual manner in which rules, calipers, and similar instruments are constructed. Level $i$ is made independently of the rule, and after being adjusted upon the swivel-table to indicate exactly horizontal position when the zero-mark "0" on the support is set opposite the pointer $p$ is screwed to the table by means of screws $s$. Stud $g$ is fitted in the turning center of the swivel-table $f$ and provided with a splint under its head to prevent its turning when thumb-screw $h$ is screwed on or off. Sliding rule $d$ may also be made of tempered spring-steel, especially for large sizes, and is finished in the same manner as steel rules and calipers.

Upon this specification I claim as my invention and desire to secure by Letters Patent—

1. A key-seating rule comprising two graduated rules set in an angular frame with a socket set vertically over the ridge of the angular frame, a graduated sliding rule moving in a slot provided in the socket; a swivel table having a semicircular support beveled and graduated on its circumference, the swivel table carrying a level permanently fastened to it and turning on a stud set in the socket, a thumb screw fitted on the stud and a pointer set upon the socket.

2. In a key-seating rule comprising two flat rules combined in an angular frame and a socket above the ridge of the frame, the combination of a swivel table having a semicircular support beveled and graduated on its edge and turning around a stud located in the center-line of the socket, this center-line being marked by a pointer upon the socket, and by a zero mark upon the edge of the support, with a level set upon the swivel table, for the purpose of ascertaining deviations of the center-line from vertical position.

FREDERICK STEMMERICH.

Witnesses:
R. F. ALBIEZ,
WILLIAM STEMMERICH.